(12) United States Patent
Saunamaki (10) Patent No.: US 11,870,295 B2
(45) Date of Patent: Jan. 9, 2024

(54) WIRELESS POWER TRANSMITTING COIL DISPOSED AT AN INPUT DEVICE

(71) Applicant: INTEL CORPORATION, Santa Clara, CA (US)

(72) Inventor: Esa Saunamaki, Virrat (FI)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 16/904,216

(22) Filed: Jun. 17, 2020

(65) Prior Publication Data

US 2020/0321803 A1 Oct. 8, 2020

Related U.S. Application Data

(63) Continuation of application No. 14/721,774, filed on May 26, 2015, now abandoned.

(51) Int. Cl.

| | |
|---|---|
| *H02J 7/00* | (2006.01) |
| *H02J 7/04* | (2006.01) |
| *H02J 50/10* | (2016.01) |
| *G06F 1/26* | (2006.01) |
| *G06F 1/16* | (2006.01) |
| *G06F 3/023* | (2006.01) |
| *G06F 3/038* | (2013.01) |

(52) U.S. Cl.
CPC .............. *H02J 7/04* (2013.01); *G06F 1/1632* (2013.01); *G06F 1/1698* (2013.01); *G06F 1/266* (2013.01); *G06F 3/0231* (2013.01); *G06F 3/0383* (2013.01); *H02J 7/0042* (2013.01); *H02J 50/10* (2016.02); *G06F 2203/0384* (2013.01)

(58) Field of Classification Search
CPC . H02J 17/00; H02J 7/025; H02J 5/005; B60L 11/1824; B60L 11/1833; B60L 11/1846
USPC ......................................................... 320/108
See application file for complete search history.

(56) References Cited

U.S. PATENT DOCUMENTS

| | | | |
|---|---|---|---|
| 6,480,372 B1 * | 11/2002 | Vong | G06F 3/0231 |
| | | | 361/679.08 |
| 7,180,265 B2 | 2/2007 | Naskali et al. | |
| 8,185,755 B2 | 5/2012 | Yamasuge | |
| 8,427,101 B2 | 4/2013 | Saunamaki | |
| 8,552,594 B2 | 10/2013 | Wada et al. | |
| 8,655,272 B2 | 2/2014 | Saunamaki | |

(Continued)

FOREIGN PATENT DOCUMENTS

| | | | |
|---|---|---|---|
| CN | 101105716 | * | 1/2008 |
| CN | 101105716 A | * | 1/2008 |

(Continued)

OTHER PUBLICATIONS

European Search Report, for EP Application No. 16165888, dated Sep. 28, 2016, 16 pages.

(Continued)

*Primary Examiner* — Yalkew Fantu
(74) *Attorney, Agent, or Firm* — Banner & Witcoff Ltd.

(57) ABSTRACT

Techniques for wireless charging in a system, method, and apparatus are described herein. For example, the apparatus includes a wireless power transmitting coil configured to propagate current to generate a magnetic field. The wireless power transmitting coil is disposed in a hand-operated input device.

20 Claims, 9 Drawing Sheets

(56) References Cited

U.S. PATENT DOCUMENTS

| | | |
|---|---|---|
| 2006/0087282 A1 | 4/2006 | Baarman et al. |
| 2006/0091960 A1 | 5/2006 | Phillips et al. |
| 2009/0079268 A1 | 3/2009 | Cook et al. |
| 2009/0096413 A1* | 4/2009 | Partovi ............... H02J 50/80 320/108 |
| 2010/0146308 A1* | 6/2010 | Gioscia ............... G06F 1/26 307/104 |
| 2010/0148939 A1* | 6/2010 | Yamada ............ H02J 7/00045 340/10.34 |
| 2010/0194206 A1* | 8/2010 | Burdo ............... H02J 50/90 320/108 |
| 2010/0217353 A1* | 8/2010 | Forsell ............... H02J 50/80 607/61 |
| 2010/0259215 A1* | 10/2010 | Sip ............... H02J 7/0044 320/108 |
| 2010/0277120 A1 | 11/2010 | Cook et al. |
| 2011/0057606 A1 | 3/2011 | Saunamaki |
| 2011/0115430 A1 | 5/2011 | Saunamaki |
| 2011/0142522 A1* | 6/2011 | Yeh ............... B41J 5/00 400/474 |
| 2012/0176317 A1* | 7/2012 | Jin ............... H02J 7/0042 345/163 |
| 2012/0223595 A1* | 9/2012 | Oodachi ............... H02J 50/70 307/104 |
| 2013/0043734 A1* | 2/2013 | Stone ............... H02J 50/40 307/104 |
| 2013/0069586 A1 | 3/2013 | Jung et al. |
| 2013/0093390 A1 | 4/2013 | Partovi |
| 2013/0119773 A1 | 5/2013 | Davis |
| 2013/0134794 A1* | 5/2013 | Lee ............... H02J 7/025 307/104 |
| 2013/0154557 A1 | 6/2013 | Lee et al. |
| 2013/0187474 A1 | 7/2013 | De Boodt |
| 2013/0225104 A1 | 8/2013 | Ahn et al. |
| 2013/0300205 A1 | 11/2013 | Tzanidis et al. |
| 2014/0044293 A1 | 2/2014 | Ganem et al. |
| 2014/0139037 A1 | 5/2014 | Sasha et al. |
| 2014/0191586 A1* | 7/2014 | Ichikawa ............... H01F 38/14 307/104 |
| 2014/0225563 A1* | 8/2014 | Ichikawa ............... B60L 53/34 320/108 |
| 2014/0240057 A1* | 8/2014 | Low ............... H02J 50/40 333/32 |
| 2014/0246920 A1* | 9/2014 | Bae ............... H02J 50/80 307/104 |
| 2014/0247006 A1 | 9/2014 | Yu |
| 2014/0339910 A1 | 11/2014 | Sealy |
| 2015/0084427 A1* | 3/2015 | Moon ............... H02J 7/025 307/104 |
| 2015/0097443 A1 | 4/2015 | Moyer et al. |
| 2015/0102680 A1 | 4/2015 | Menegoli |
| 2015/0117161 A1* | 4/2015 | Nichol ............... G04B 47/063 368/10 |
| 2015/0130411 A1* | 5/2015 | Kim ............... G04G 17/00 320/108 |
| 2015/0340902 A1 | 11/2015 | Luukkainen et al. |
| 2016/0149434 A1* | 5/2016 | Kim ............... H02J 50/90 320/108 |
| 2016/0181822 A1 | 6/2016 | Yang et al. |
| 2016/0181851 A1 | 6/2016 | Porat et al. |
| 2016/0352133 A1 | 12/2016 | Saunamaki |

FOREIGN PATENT DOCUMENTS

| | | |
|---|---|---|
| CN | 201662773 | * 12/2010 |
| CN | 201662773 U | * 12/2010 |
| CN | 103718426 A | 4/2014 |
| CN | 104223612 A | 12/2014 |
| CN | 204129668 U | 1/2015 |
| EP | 2056426 A2 | 5/2009 |
| JP | H04185236 A | 7/1992 |
| JP | 2004033596 A | 2/2004 |
| JP | 2010014531 A | 1/2010 |
| KR | 20100026075 A | 3/2012 |
| KR | 20120129821 A | 11/2012 |
| WO | 2010093997 A1 | 8/2010 |
| WO | 2012177283 A1 | 12/2012 |
| WO | 2014178575 A1 | 6/2014 |

OTHER PUBLICATIONS

TW Search Report, TW Application No. 104138805, dated Dec. 29, 2016, 3 pages.

Supplemental European Search Report for EP Application No. EP15873870, with a completion date of May 31, 2018, 3 pages.

Supplemental European Search Report for EP Application No. EP15873869, with a completion date of Jul. 9, 2018, 3 pages.

* cited by examiner

WIRELESS POWER TRANSMITTING COIL DISPOSED AT AN INPUT DEVICE

CROSS-REFERENCE TO RELATED APPLICATION

This application is a continuation of U.S. patent application Ser. No. 14/721,774, filed May 26, 2015, the entire contents of which are hereby incorporated by reference as though fully set forth herein.

TECHNICAL FIELD

This disclosure relates generally to techniques for wireless charging. Specifically, this disclosure relates to wireless power transmitting at an ergonomic product.

BACKGROUND ART

A basic wireless charging system may include a wireless power transmitter unit (PTU) and a wireless power receiving unit (PRU). For example, a PTU may include one or more transmit (Tx) coils, and a PRU may include receive (Rx) coil. Magnetic resonance wireless charging may employ a magnetic coupling between the Tx coil and the Rx coil. As wearable computing devices become increasingly popular, wireless charging systems may be implemented as charging systems for the wearable devices as opposed, or even in addition, to traditional wired charging systems. However, in many cases, wearable computing devices vary in shape and size making it challenging to find designs wherein wearable computing devices can be charged.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wireless charging. Specifically, the techniques described herein include a wireless power transmitting coil disposed within an ergonomic product such as a hand-operated input device, a support for a wrist, palm, hand, or other parts of the human body, and the like. A user of a wirelessly chargeable may spend several hours a day at a computing device. The user may interact with the computing device via a hand-operated input device. For example, a user may use a mouse to interact with a computing device. Therefore, the techniques described herein include disposing a wireless power transmitting (Tx) coil at or within a hand-operated input device. Disposing the wireless Tx coil within the hand-operated input device may enable convenient charging of a wearable device, such as a watch, having a wireless power receiving (Rx) coil while a user is using the hand-operated input device. In some cases, the Tx coil may be disposed in any ergonomic support structure where a user may more often place a hand, arm, ankle, and the like. For example, the Tx coil may be disposed in an ergonomic support in a computer, a table either as integrated or as an accessory, ergonomic support in a automobile. Ergonomic support may be a feature configured to guide a body member to a position, wherein coupling between a Tx coil and Rx coil is increased.

A hand-operated input device, as referred to herein, may include a human input device including a computing device configured to interact with a user at, or near, a hand of the user. In some cases, the hand-operated input device may include a keyboard, a mouse, and the like. A hand-operated input device may be referred to herein as a hand-operated input device, an input device, or any combination there. In some cases, the wireless power Tx coil may be disposed in a platform associated with the hand-operated input device. For example, a keyboard may include a pad or platform wherein the wireless power Tx coil may be disposed within the pad.

Figure 1:
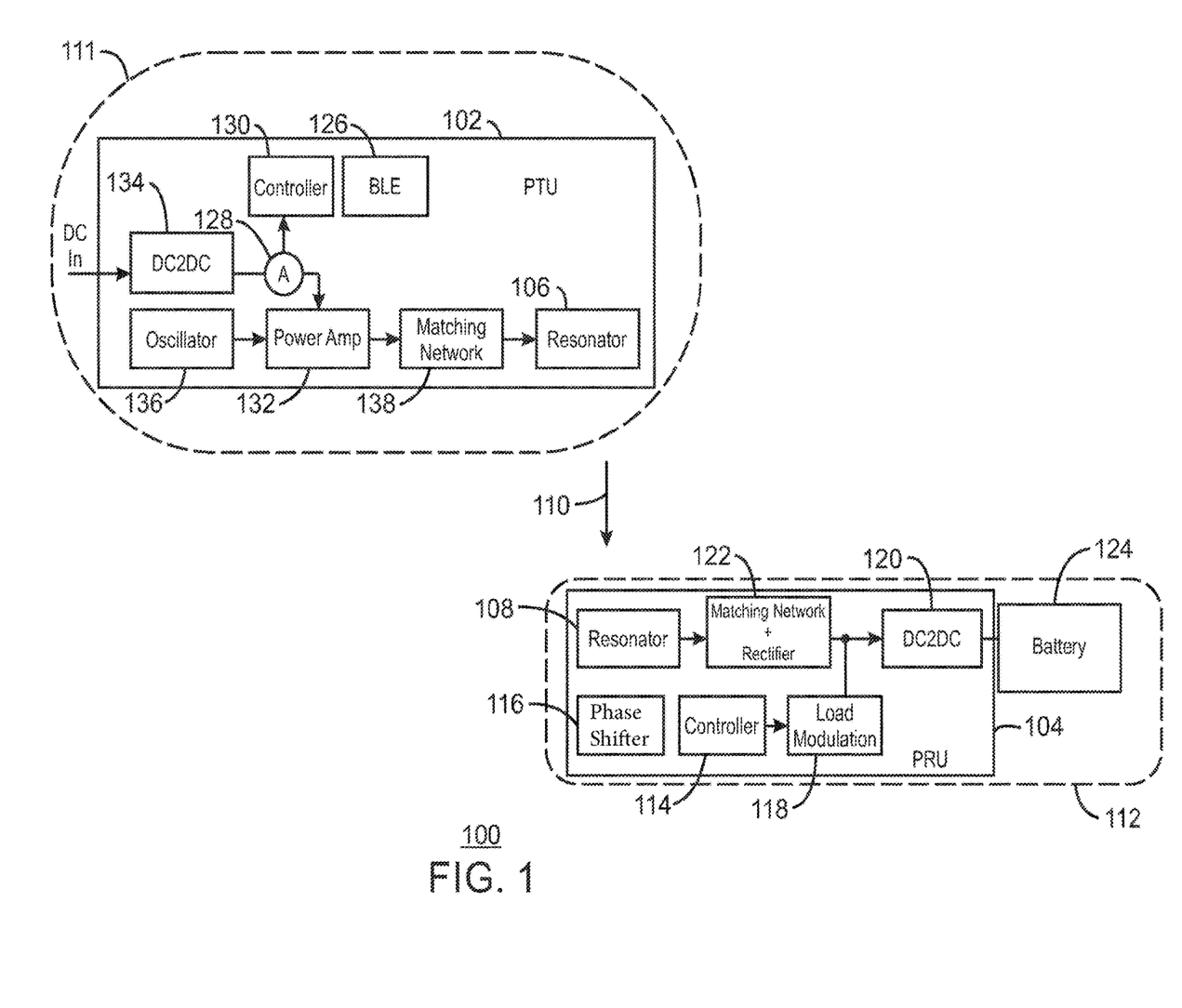
FIG. 1 is block diagram of a PTU to provide power to a PRU, wherein the PTU includes a hand-operated input device.

FIG. 1 is block diagram of a PTU to provide power to a PRU, wherein a magnetic component protrudes from the PTU. A PTU 102 may couple to a PRU 104 via magnetic inductive coupling between resonators 106, and 108, as indicated by the arrow 110. The resonator 106 may be referred to herein as a Tx coil 106 of the PTU 102. The resonator 108 may be referred to herein as an Rx coil 108 of the PRU 104.

As discussed above, the Tx coil 106 may be disposed in an input device as indicated by the dashed outline 111. For example, the input device 111 may be a computer mouse, touch pad, or similar input device configured to detect input such as movement of a user's hand in coordinates, upon detection of pressure from the user's fingers, and the like. The PRU 104 may be disposed within a wearable computing device indicated at the dashed circle 112. The wearable computing device 112 may be configured to be worn near a user's hand. For example, the wearable device may be a bracelet, a watch, a ring, a glove, or any other wearable computing device that will be near the input device 111 during use of the input device 111. In other words, the techniques described herein include a Tx coil, such as the Tx coil 106, disposed within an input device, such as the input device 111, which may enable convenient charging of a wearable computing device, such as the wearable computing device 112. In some cases, the Tx coil 106 may be used to power up a wearable low power input/sensor device that does not have a battery such as a battery 124 of the wearable device 112, but a capacitor/super capacitor for energy storage.

The PRU 104 may include a controller 114 configured to detect current received at the Rx coil 108 resulting from an inductive coupling between the Tx coil 106 and the Rx coil 108. In some cases, the controller 114 may be configured to initiate a wireless data broadcast via a wireless transmission component.

The wireless data transmission component may be Bluetooth Low Energy (BLE) module 116 in some cases. In some cases, the wireless data transmission component may be integrated as operations of the controller 114, a load modulation circuit 118, a direct current to direct current (DC to DC) converter 120, or any combination thereof, wherein the data transmission may be indicated by patterns in the load modulation. The wireless data broadcast may transmit data during operation of the input device 111. For example, health data such as a user's heart rate, temperature, and the like may be monitored during use the input device 111. In some cases, monitoring health data may be used to remind the user to shift movement or perform physical action to meet health related goals. Other types of data may be transmitted based on functions of the wearable computing device 112.

As illustrated in FIG. 1, the DC to DC converter 120 provides a DC output to a battery 124, or another current/power consuming component. The DC TO DC converter 120 may convert DC received as a result of the inductive coupling of the Tx coil 106, the Rx coil 108, and the rectifier 122.

The PTU 102 may include a BLE module 126 configured to communicate with the BLE module 116. The PTU 102 may also include a current sensor 128, a controller 130, a power amplifier 132, a DC TO DC converter 134, an oscillator 136, and a matching network 138. The current sensor 128 may be an ampere meter, a volt meter, or any other meter configured to sense load variations occurring due to inductive coupling between the PTU 102 and another object, such as the PRU 104. The current sensor 128 may provide an indication of load change to a controller 130 of the PTU 102. The controller 130 may power on the power amplifier 132 configured to receive direct current (DC) from the DC TO DC converter 134, and to amplify and oscillate the current. An oscillator 136 may oscillate the power provided at a given frequency and a matching network 138 may be used to match the amplified oscillation provided to the resonator 106 of the PTU 102.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation. For example, in some cases, the PTU 102 may include multiple Tx coils, such as the Tx coil 106. In this scenario, coupling to the Rx coil 108 to one of the Tx coils may be based on a strength of the coupling between the Rx coil 108 and one of the multiple Tx coils.

Figure 2:
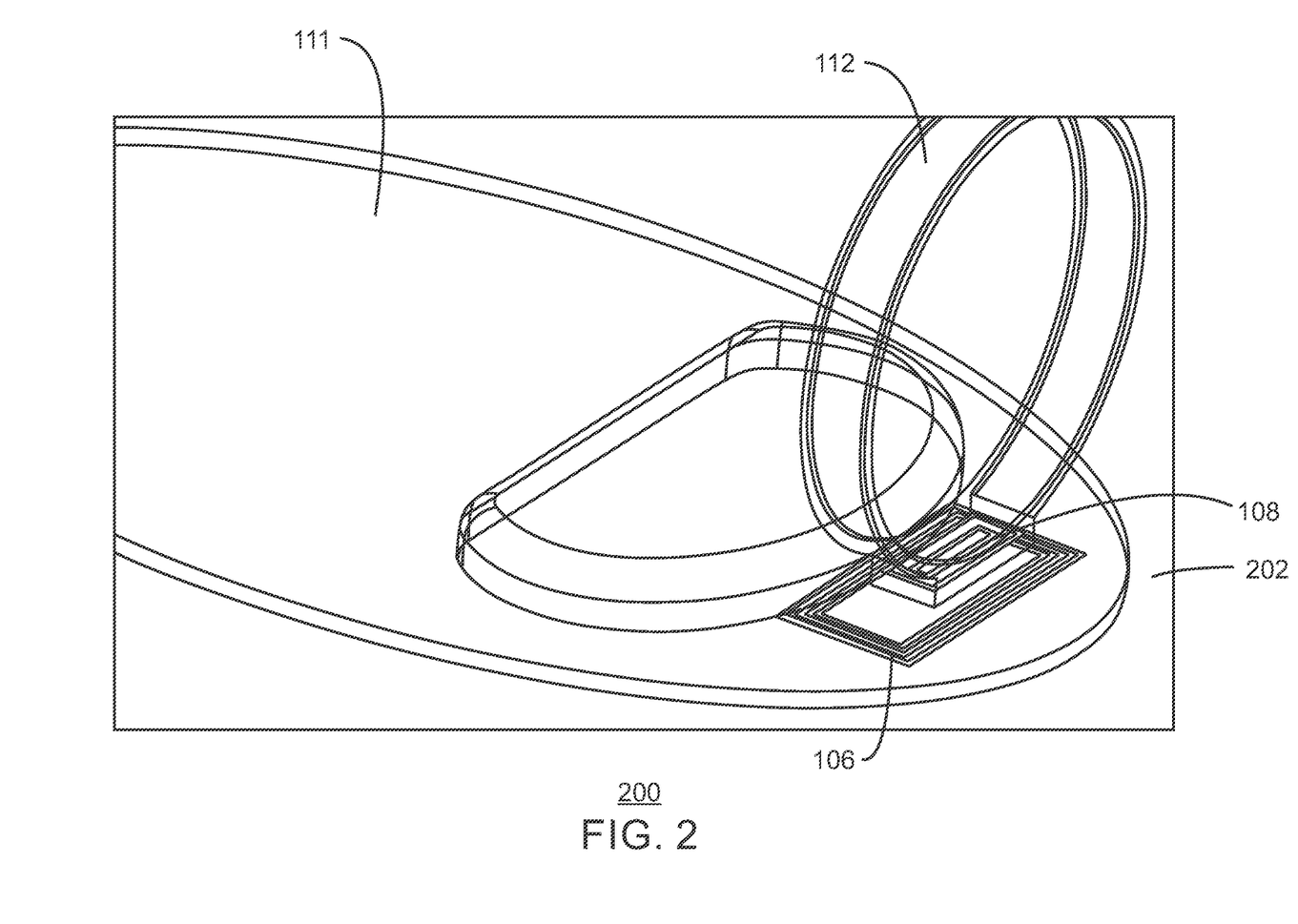
FIG. 2 is an illustration of a perspective view of an example wireless power transmitting coil disposed within a platform of a hand-operated input device.

FIG. 2 is an illustration of a perspective view of an example wireless power transmitting coil disposed within a platform of a hand-operated input device. In the example 200 of FIG. 1, an input device, such as the input device 111 of FIG. 1, may include a wireless power transmitting coil, such as the Tx coil 106. A wearable computing device, such as the wearable computing device 112 of FIG. 1, may include a wireless power receiving coil, such as the wireless power Rx coil 108 of FIG. 1.

As illustrated in FIG. 2, the Rx coil 108 of the wearable computing device 112 may be received at input device 111 such that wireless coupling may be performed between the Rx coil 108 and the Tx coil 106 of the input device. In FIG. 2 the Tx coil 106 is disposed substantially parallel to a surface 202.

Figure 3:
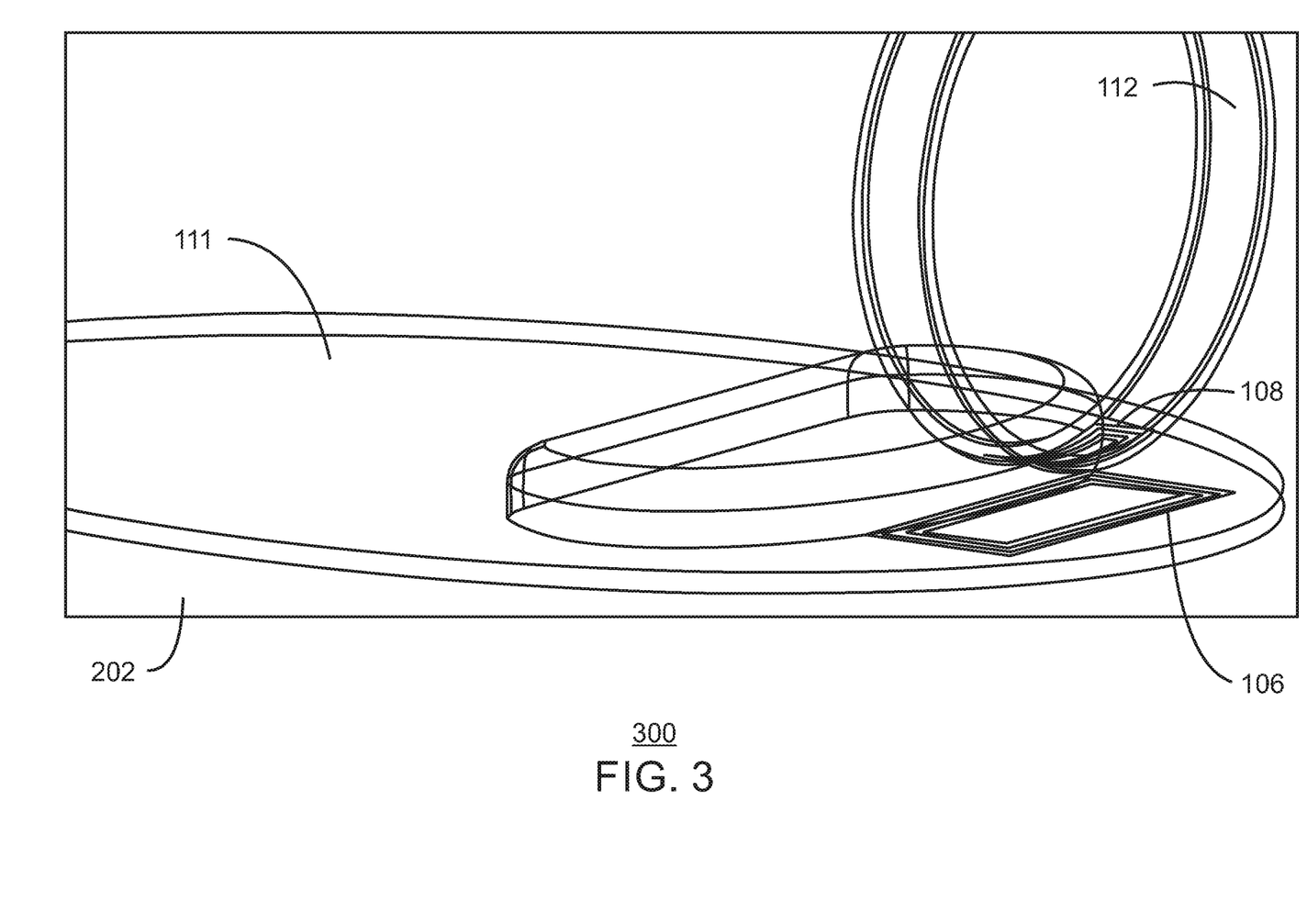
FIG. 3 is an illustration of a perspective view of another example wireless power transmitting coil disposed within a platform of a hand-operated input device.

FIG. 3 is an illustration of a perspective view of another example wireless power transmitting coil disposed within a platform of a hand-operated input device. In example 300, the Rx coil 108 of FIG. 1 is disposed along a curve of the wearable device 112. In comparison to FIG. 2 wherein the Rx coil 108 is disposed along a flat planar surface, the Rx coil 108 illustrated in FIG. 3 may exhibit a reduced magnetic coupling for wireless charging as portions of the Rx coil 108 may be farther away from the Tx coil 106. Therefore, in some cases, the Tx coil 106 may be shaped to mimic a shape of the wearable computing device 112. Further, even if some portions of the Rx coil 108 are farther away from the Tx coil 106, the disposition of the Tx coil 108 in the input device 111 may increase a duration magnetic coupling during use of the input device 111 thereby conveniently charging the wearable computing device 112.

Figure 4:
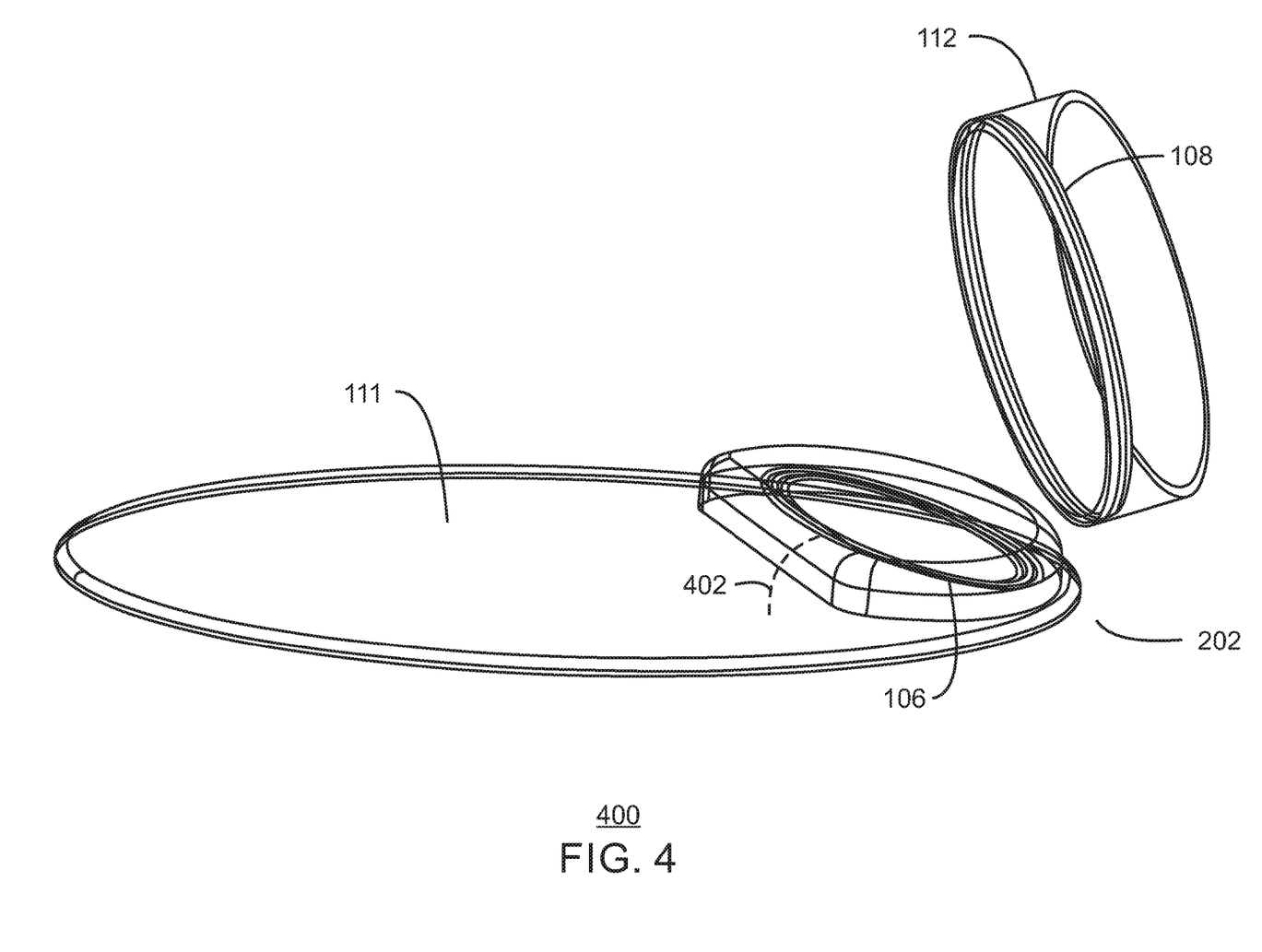
FIG. 4 is an illustration of a perspective view of an example wireless power transmitting coil disposed at an angle within a platform of a hand-operated input device.

FIG. 4 is an illustration of a perspective view of an example wireless power transmitting coil disposed at an angle within a platform of a hand-operated input device. In example 400, the Tx coil 106 is formed at an angle to the surface 202 upon which the input device 111 is operated, as indicated by the dashed curve 402. Further, in this example 400, the Rx coil 108 is formed along a loop of the wearable computing device 108. A coupling may occur between the angled Tx coil 106 and the Rx coil 108. The angle 402 may increase magnetic coupling in the example 400 illustrated in FIG. 4. In some cases, the angle 402 may be formed to align with a shape of a user's hand support, wrist support, palm support, and the like.

Figure 5:
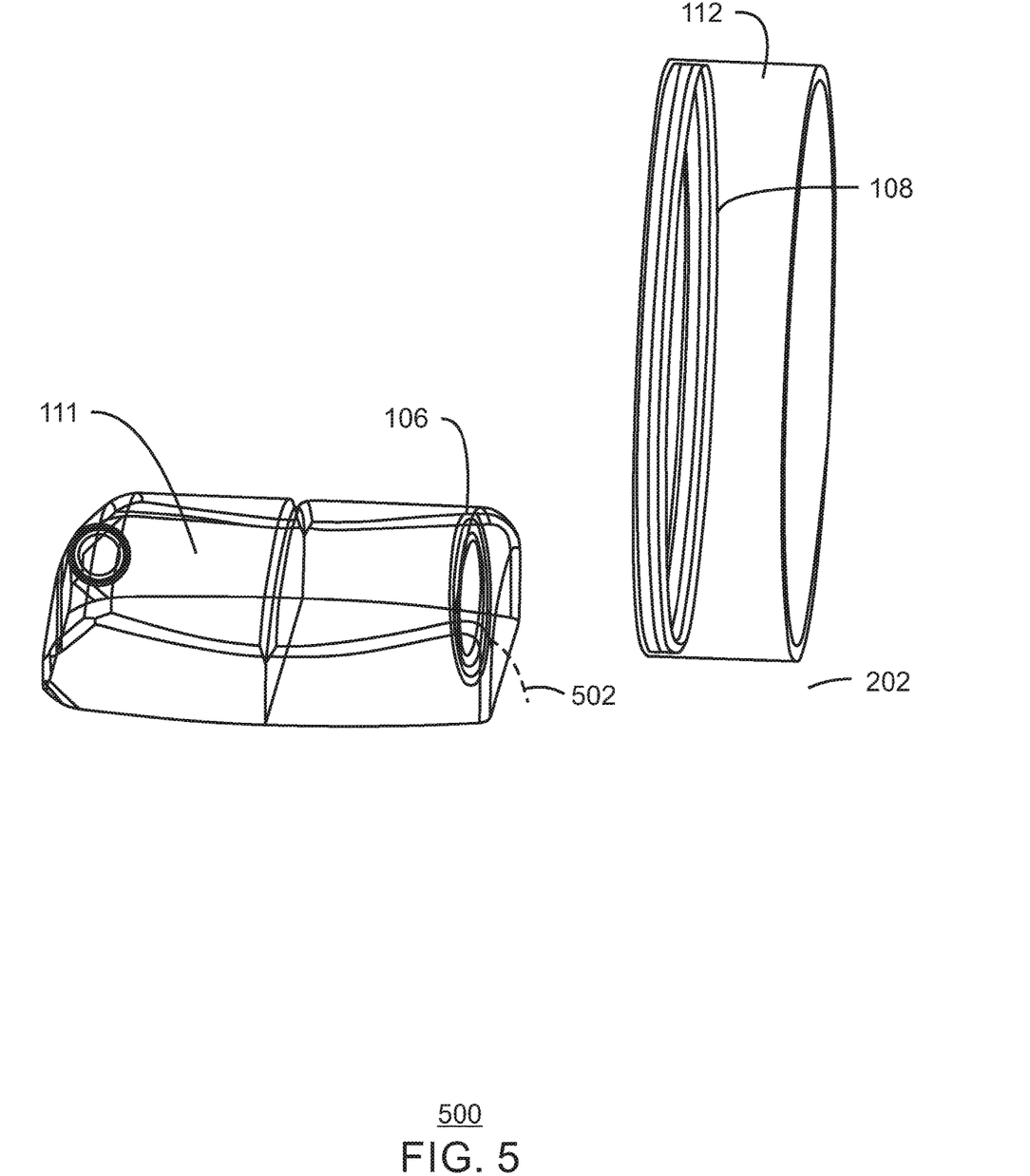
FIG. 5 is an illustration of a perspective view of an example wireless power transmitting coil disposed at a substantially perpendicular angle within a platform of a hand-operated input device.

FIG. 5 is an illustration of a perspective view of an example wireless power transmitting coil disposed at a substantially perpendicular angle within a platform of a hand-operated input device. In example 500, the Tx coil 106 is formed at an angle that is substantially perpendicular to the surface upon which the input device 111 is configured to operate, as indicated by the dashed curve 502. In this scenario, the substantially perpendicular angle 502 may increase magnetic coupling between the Tx coil 106 and the Rx coil 108. Similar to example 400, the Rx coil 108 in example 500 is formed along a loop of the wearable computing device 108, as illustrated in FIG. 5.

Figure 6:
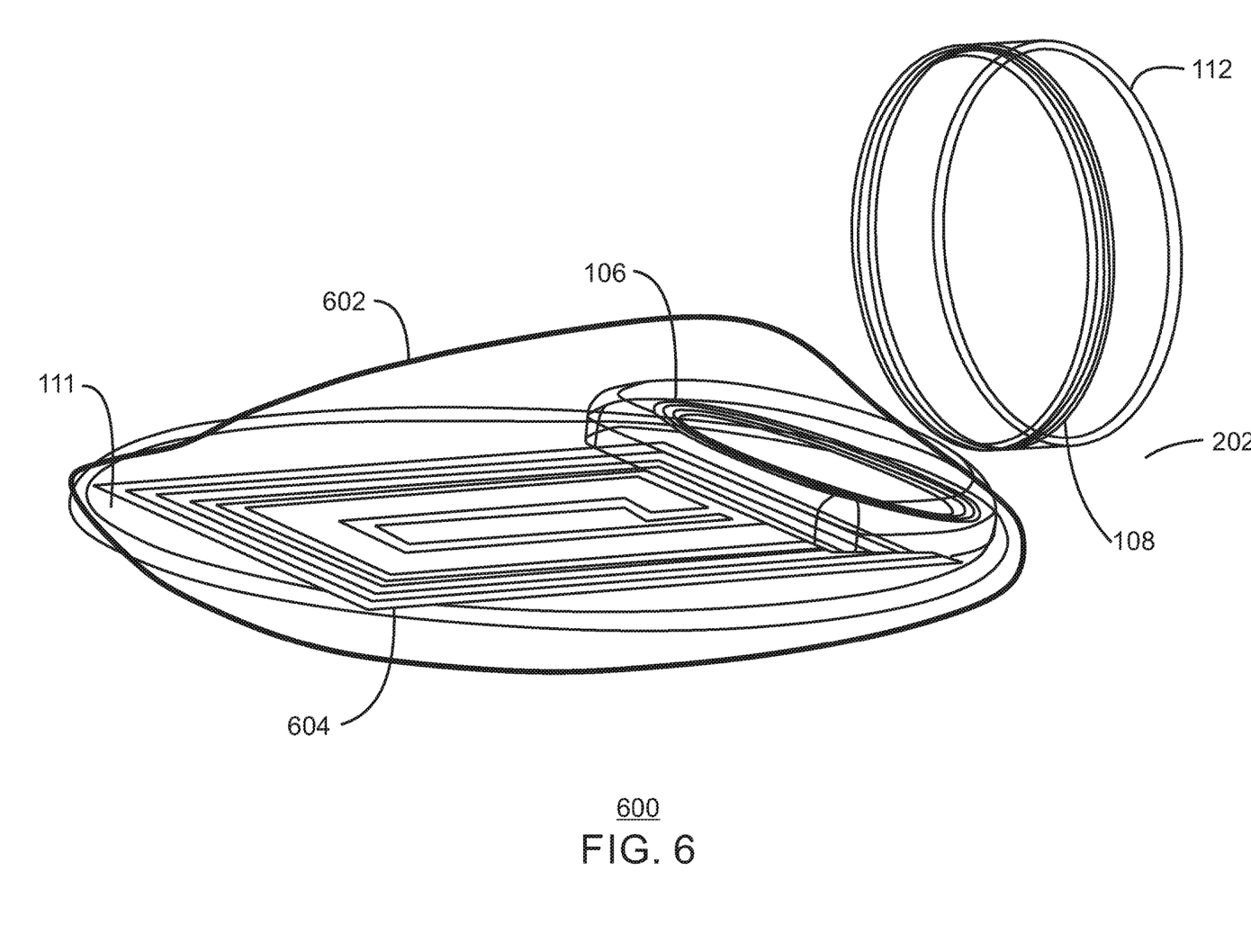
FIG. 6 is an illustration of a perspective view of an example wireless power transmitting coil as a component of a power propagation device disposed within a platform of a hand-operated input device.

FIG. 6 is an illustration of a perspective view of an example wireless power transmitting coil as a component of a power propagation device disposed within a platform of a hand-operated input device. In some cases, an input device, such as the input device 111 of FIG. 1 may include a power propagation device indicated at 602. The power propagation device 602 may include including the Tx coil 106 and an Rx coil 604 configured to receive power from another Tx coil (not shown) disposed at the surface 202, under the surface 202, or any combination thereof.

In some cases, the input device 111 may passively provide wireless power via wireless power repeating. In some cases, ferromagnetic sheets or other elements may be included to optimize coupling between the Tx coil 106 and the Rx coil 108. In some cases, the input device 111 may repeat wireless power received at the Rx coil 602, as well as charge the input device 111 via the power received. In some cases, the power propagation device 602 may be implemented with a phase shifting component that may couple the Rx coil 604 to the Tx coil 106. The phase shifting component may ensure that an impedance inversion is generated by the power propagation device 602. In some cases, the phase shifting component may enable a constant current source to be provided from the PTU 102 regardless of the strength of a magnetic coupling between the Rx coil 108 of the wearable device 112 and the Tx coil 106. Examples of the phase shifting component 116 may include an impedance transformer, a transformer, a quarter wavelength transmission line, any combination thereof, among others. In general, a passive coupler structure in an input device and/or ergonomic platform may be used to guide magnetic fields to an area where a wearable device is typically disposed.

Figure 7:
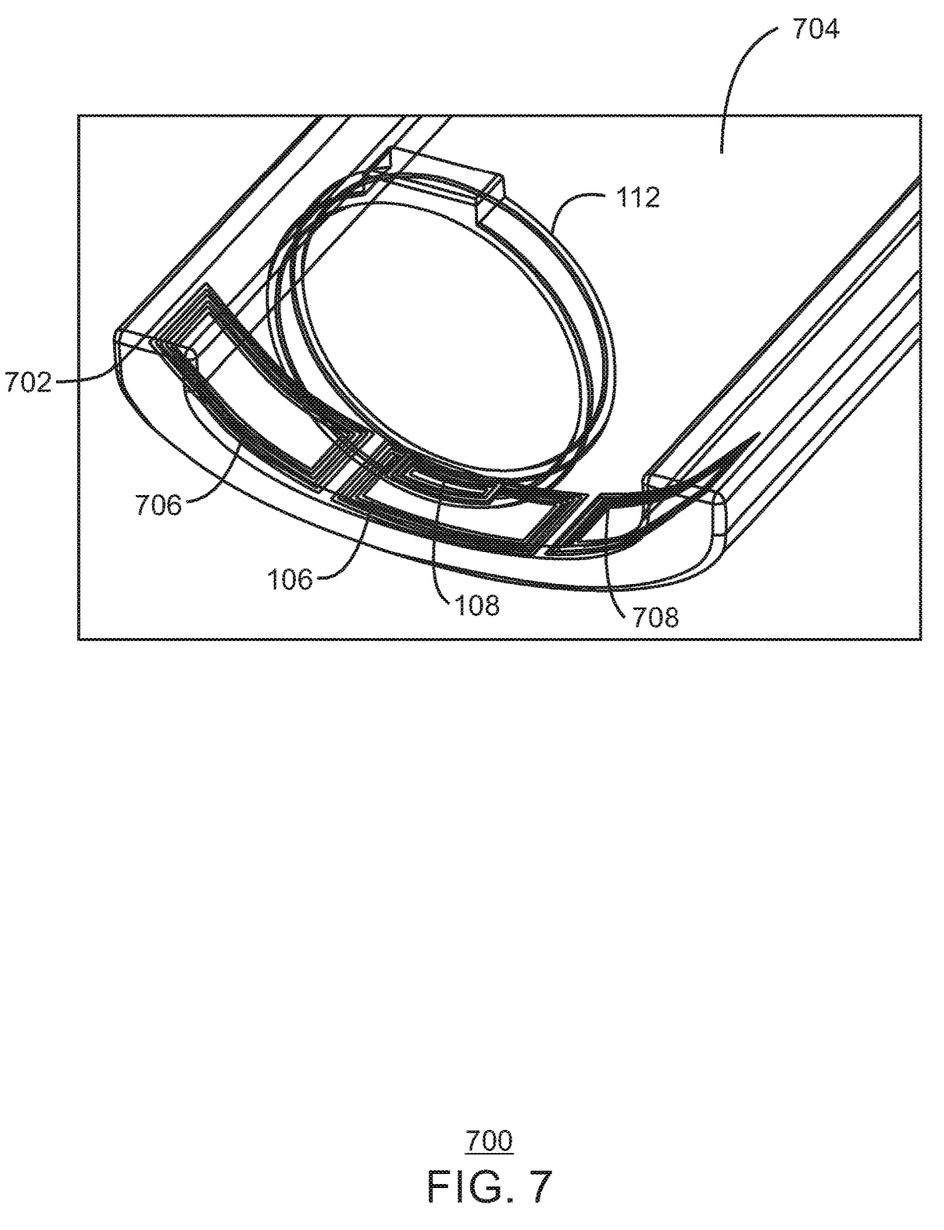
FIG. 7 is an illustration of a perspective view of an example wireless power transmitting coil as a component of an ergonomic platform.

FIG. 7 is an illustration of a perspective view of an example wireless power transmitting coil as a component of an ergonomic platform. An ergonomic platform 702 may be useful in charging the wearable device 112 via coupling between the Tx coil 106 and the Rx coil 108. In some cases, the ergonomic platform 702 may include a surface 704 configured to receive a portion of the wearable device 112 due to a shape of the surface 704. Therefore, the wearable device 112 may be conveniently charged. In some cases, the ergonomic platform 702 may include multiple Tx coils including Tx coil 106, as well as Tx coil 706 and Tx coil 708. In this scenario, the Rx coil 108 may couple to any of the Tx coils 106, 706, and/or 708.

Figure 8:
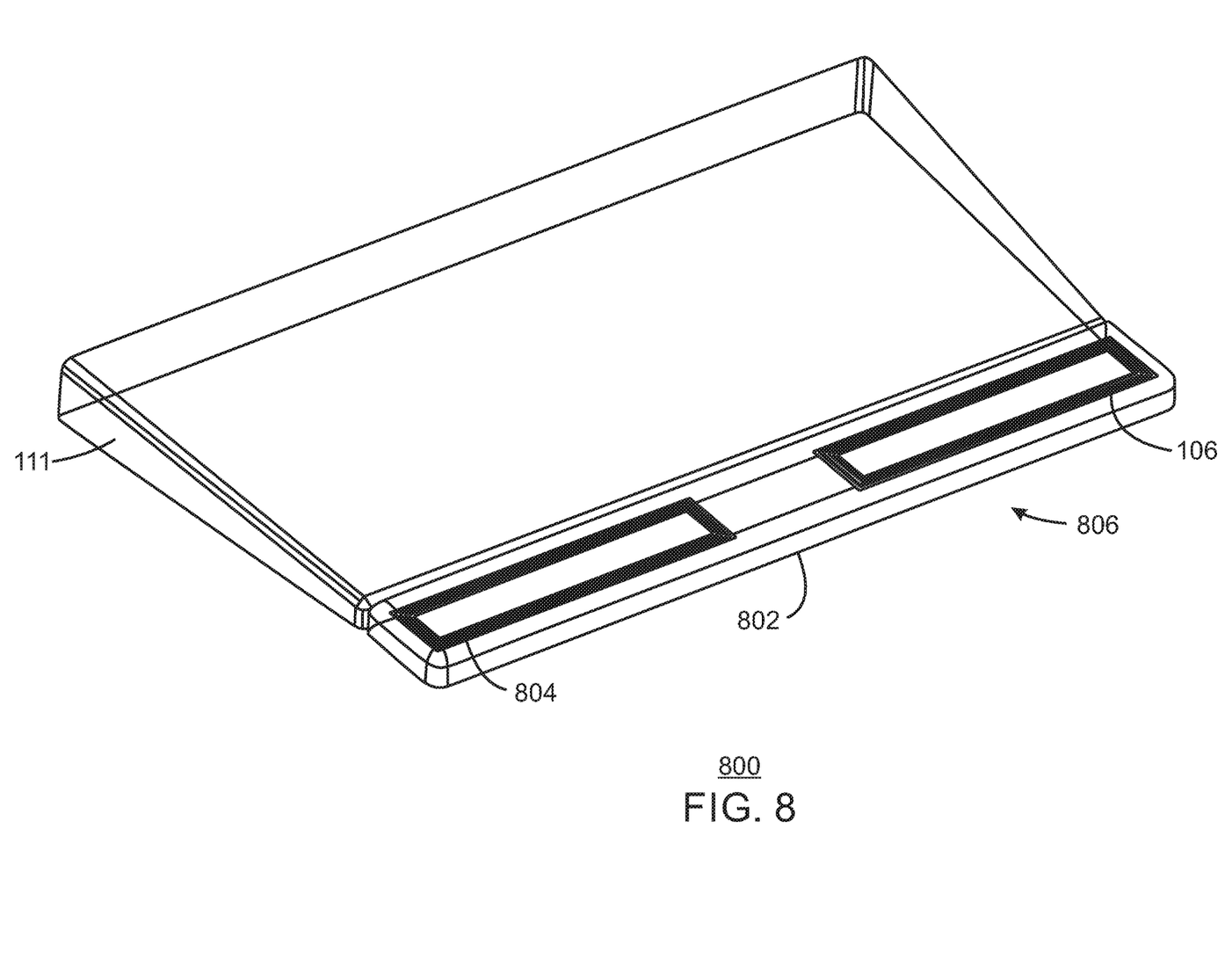
FIG. 8 is an illustration of a perspective view of an example wireless power transmitting coil as a component of an ergonomic platform in an input device.

FIG. 8 is an illustration of a perspective view of an example wireless power transmitting coil as a component of an ergonomic platform in an input device. In FIG. 8, the Tx coil 106 is disposed within an ergonomic platform 802 that is wrist support for an input device, such as the input device 111 of FIG. 1 that is a keyboard. The ergonomic platform 802 may include multiple Tx coils including Tx coil 106 and Tx coil 804. The disposition of Tx coils, such as one or more of the Tx coils 106 and 804, may enable convenient charging of a wireless charging system in a wearable device configured to be worn on or near a body part configured to be used near the input device 111.

Figure 9:
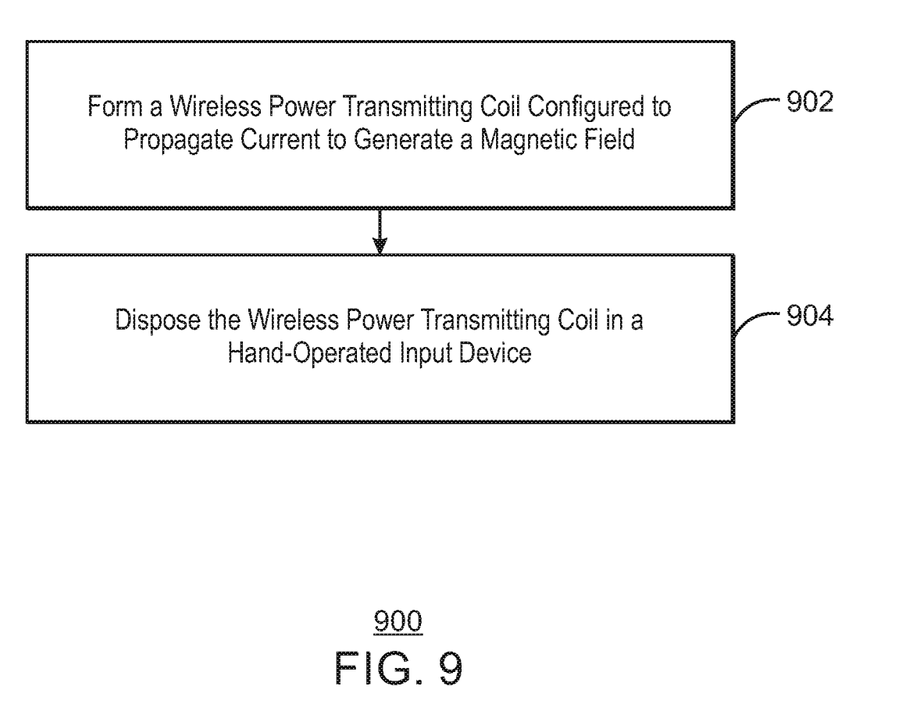
FIG. 9 is a flow diagram of a method for forming a device for wireless charging.

FIG. 9 is a flow diagram of a method for forming a device for wireless charging. At 902, a wireless power transmitting coil is formed. The wireless power transmitting coil may be configured to propagate current to generate a magnetic field. At 904, the method 900 includes disposing the wireless power receiving coil in a hand-operated input device.

In some cases, the wireless power transmitting coil is disposed in a platform of the hand-operated input device. Further, in some cases, the wireless power transmitting coil is disposed at an angle to a planar surface upon which the hand-operated input device is configured to operate. The angle may be substantially perpendicular to the planar surface in some examples.

The wireless power transmitting coil may include a first wireless power transmitting coil. In some cases, the method 900 may further include forming a wireless power receiving coil of the power propagation device to receive a magnetic flux from a second wireless power transmitting coil disposed at a planar surface upon which the hand-operated input device is configured to operate. In this scenario, the method 900 may include forming a phase shifting component coupling the first wireless power receiving coil to the first wireless power transmitting coil, wherein the phase shifting component is configured to generate an impedance inversion.

The magnetic field of the transmitting coil may be associated with a flux. The flux is configured to generate current in a wireless power receiving coil of a chargeable device. The chargeable device may be configured to be charged when the hand-operated input device is in use. In some cases, the hand-operated input device may include a keyboard, a computer mouse, or any combination thereof.

Example 1 is an apparatus for wireless charging. In this example, the wireless charging device may include a wireless power transmitting coil configured to propagate current to generate a magnetic field, and wherein the wireless power transmitting coil is disposed in a hand-operated input device.

Example 2 includes the apparatus of example 1. In this example, the wireless power transmitting coil is disposed in a platform of the hand-operated input device.

Example 3 includes the apparatus of any combination of examples 1-2. In this example, the wireless power transmitting coil is disposed at an angle to a planar surface upon which the hand-operated input device is configured to operate.

Example 4 includes the apparatus of any combination of examples 1-3. In this example, the angle is substantially perpendicular to the planar surface.

Example 5 includes the apparatus of any combination of examples 1-4. In this example, the wireless power transmitting coil is a component of a power propagation device disposed in the hand-operated input device.

Example 6 includes the apparatus of any combination of examples 1-5. In this example, the wireless power transmitting coil is a first wireless power transmitting coil, the power propagation device further comprising a wireless power receiving coil to receive a magnetic flux from a second wireless power transmitting coil disposed at a planar surface upon which the hand-operated input device is configured to operate.

Example 7 includes the apparatus of any combination of examples 1-6. This example includes a phase shifting component coupling the first wireless power receiving coil to the first wireless power transmitting coil, and wherein the phase shifting component is configured to generate an impedance inversion.

Example 8 includes the apparatus of any combination of examples 1-7. In this example a flux of the magnetic field is configured to generate current in a wireless power receiving coil of a chargeable device.

Example 9 includes the apparatus of any combination of examples 1-8. In this example, the chargeable device is configured to be charged when the hand-operated input device is in use.

Example 10 includes the apparatus of any combination of examples 1-9. In this example, the hand-operated input device may include a keyboard, a computer mouse, or any combination thereof.

Example 11 is a method for forming a wireless charging apparatus, the method comprising: forming a wireless power transmitting coil configured to propagate current to generate a magnetic field, and disposing the wireless power transmitting coil in an ergonomic component.

Example 12 includes the method of example 11. In this example, the wireless power transmitting coil is disposed in a platform of the ergonomic component.

Example 13 includes the method of any combination of examples 11-12. In this example, the ergonomic component is configured to be placed on a planar surface, and wherein the wireless power transmitting coil is disposed at an angle to the planar surface.

Example 14 includes the method of any combination of examples 11-13. In this example, the angle is substantially perpendicular to the planar surface.

Example 15 includes the method of any combination of examples 11-14. In this example, the wireless power transmitting coil is a component of a power propagation device disposed in the ergonomic component.

Example 16 includes the method of any combination of examples 11-15. In this example, the wireless power transmitting coil is a first wireless power transmitting coil, the method further comprising forming a wireless power receiving coil of the power propagation device to receive a magnetic flux from a second wireless power transmitting coil disposed at a planar surface upon which the ergonomic component is configured to be disposed.

Example 17 includes the method of any combination of examples 11-16. In this example, the wireless power transmitting coil is a first wireless power transmitting coil further comprising forming a second wireless power transmitting coil within the ergonomic component.

Example 18 includes the method of any combination of examples 11-17. In this example a flux of the magnetic field is configured to generate current in a wireless power receiving coil of a chargeable device.

Example 19 includes the method of any combination of examples 11-18. In this example, the chargeable device is configured to be charged when the ergonomic component is in use.

Example 20 includes the method of any combination of examples 11-19. In this example, the ergonomic component may include a support associated with a keyboard, a support associated with a computer mouse, or any combination thereof.

Example 21 is a system for wireless charging. In this example, the wireless charging device may include a wireless power transmitting coil configured to propagate current to generate a magnetic field, and wherein the wireless power transmitting coil is disposed in a hand-operated input device, and a chargeable device configured to be charged when the hand-operated input device is in use.

Example 22 includes the system of example 21. In this example, the wireless power transmitting coil is disposed in a platform of the hand-operated input device.

Example 23 includes the system of any combination of examples 21-22. In this example, the wireless power transmitting coil is disposed at an angle to a planar surface upon which the hand-operated input device is configured to operate.

Example 24 includes the system of any combination of examples 21-23. In this example, the angle is substantially perpendicular to the planar surface.

Example 25 includes the system of any combination of examples 21-24. In this example, the wireless power transmitting coil is a component of a power propagation device disposed in the hand-operated input device.

Example 26 includes the system of any combination of examples 21-25. In this example, the wireless power transmitting coil is a first wireless power transmitting coil, the power propagation device further comprising a wireless power receiving coil to receive a magnetic flux from a second wireless power transmitting coil disposed at a planar surface upon which the hand-operated input device is configured to operate.

Example 27 includes the system of any combination of examples 21-26. This example includes a phase shifting component coupling the first wireless power receiving coil to the first wireless power transmitting coil, and wherein the phase shifting component is configured to generate an impedance inversion.

Example 28 includes the system of any combination of examples 21-27. In this example a flux of the magnetic field is configured to generate current in a wireless power receiving coil of a chargeable device.

Example 29 includes the system of any combination of examples 21-28. In this example, the chargeable device is configured to be charged when the hand-operated input device is in use via inductive coupling to the wireless power transmitter coil.

Example 30 includes the system of any combination of examples 21-29. In this example, the hand-operated input device may include a keyboard, a computer mouse, or any combination thereof.

Example 31 is an apparatus for wireless charging. In this example, the wireless charging device may include a means for wireless power transmitting configured to propagate current to generate a magnetic field, and wherein the means for wireless power transmitting is disposed in a hand-operated input device.

Example 32 includes the apparatus of example 31. In this example, the means for wireless power transmitting is disposed in a platform of the hand-operated input device.

Example 33 includes the apparatus of any combination of examples 31-32. In this example, the means for wireless power transmitting is disposed at an angle to a planar surface upon which the hand-operated input device is configured to operate.

Example 34 includes the apparatus of any combination of examples 31-33. In this example, the angle is substantially perpendicular to the planar surface.

Example 35 includes the apparatus of any combination of examples 31-34. In this example, the means for wireless power transmitting is a component of a power propagation device disposed in the hand-operated input device.

Example 36 includes the apparatus of any combination of examples 31-35. In this example, the means for wireless power transmitting is a first wireless power transmitting coil, the power propagation device further comprising a wireless power receiving coil to receive a magnetic flux from a second wireless power transmitting coil disposed at a planar surface upon which the hand-operated input device is configured to operate.

Example 37 includes the apparatus of any combination of examples 31-36. This example includes a phase shifting component coupling the first wireless power receiving coil to the first wireless power transmitting coil, and wherein the phase shifting component is configured to generate an impedance inversion.

Example 38 includes the apparatus of any combination of examples 31-37. In this example a flux of the magnetic field is configured to generate current in a wireless power receiving coil of a chargeable device.

Example 39 includes the apparatus of any combination of examples 31-38. In this example, the chargeable device is configured to be charged when the hand-operated input device is in use.

Example 40 includes the apparatus of any combination of examples 31-39. In this example, the hand-operated input device may include a keyboard, a computer mouse, or any combination thereof.

Example 41 is a system for wireless charging. In this example, the wireless charging device may include a means for wireless power transmitting configured to propagate current to generate a magnetic field, and wherein the means for wireless power transmitting is disposed in a hand-operated input device, and a chargeable device configured to be charged when the hand-operated input device is in use.

Example 42 includes the system of example 41. In this example, the means for wireless power transmitting is disposed in a platform of the hand-operated input device.

Example 43 includes the system of any combination of examples 41-42. In this example, the means for wireless power transmitting is disposed at an angle to a planar surface upon which the hand-operated input device is configured to operate.

Example 44 includes the system of any combination of examples 41-43. In this example, the angle is substantially perpendicular to the planar surface.

Example 45 includes the system of any combination of examples 41-44. In this example, the means for wireless power transmitting is a component of a power propagation device disposed in the hand-operated input device.

Example 46 includes the system of any combination of examples 41-45. In this example, the means for wireless power transmitting is a first wireless power transmitting coil, the power propagation device further comprising a wireless power receiving coil to receive a magnetic flux from a second wireless power transmitting coil disposed at a planar surface upon which the hand-operated input device is configured to operate.

Example 47 includes the system of any combination of examples 41-46. This example includes a phase shifting component coupling the first wireless power receiving coil to the first wireless power transmitting coil, and wherein the phase shifting component is configured to generate an impedance inversion.

Example 48 includes the system of any combination of examples 41-47. In this example a flux of the magnetic field is configured to generate current in a wireless power receiving coil of a chargeable device.

Example 49 includes the system of any combination of examples 41-48. In this example, the chargeable device is configured to be charged when the hand-operated input device is in use via inductive coupling to the wireless power transmitter coil.

Example 50 includes the system of any combination of examples 41-49. In this example, the hand-operated input device may include a keyboard, a computer mouse, or any combination thereof.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for wireless charging, comprising:
a hand-operated input device configured to provide input to a computing device, the hand-operated input device being coupled to an ergonomic support structure configured to support a user's hand or wrist while operating the hand-operated input device; and
a wireless power transmitting coil configured to generate a magnetic field for wireless charging, wherein the wireless power transmitting coil is disposed in the ergonomic support structure proximate to where a user's wrist is to be positioned when the user is operating the hand-operated input device, the wireless power transmitting coil being disposed at an angle relative to a planar surface upon which the hand-operated input device is configured to operate, the angle aligning with a shape of the ergonomic support structure and enabling an increased magnetic coupling between the wireless power transmitting coil and a wireless power receiving coil of a wearable device worn by the user compared to the wireless power transmitting coil being disposed parallel with the planar surface,
wherein the wireless power transmitting coil is configured to wirelessly charge the wearable device worn by the user while the user is wearing the wearable device and operating the hand-operated input device, the wearable device being wirelessly charged via the magnetic coupling between the wireless power receiving coil and the wireless power transmitting coil, which is configured to provide a substantially constant current irrespective of a strength of the magnetic coupling, and
wherein the hand-operated input device further comprises a further wireless power receiving coil that is coupled to the wireless power transmitting coil and a further wireless power transmitting coil, the further wireless power receiving coil being configured to wirelessly receive power via the further wireless power transmitting coil, and to provide the wirelessly received power to the wireless power transmitting coil via wireless power repeating.

2. The apparatus of claim 1, wherein the hand-operated input device is a computer keyboard.

3. The apparatus of claim 1, wherein the hand-operated input device is a computer mouse.

4. The apparatus of claim 1, wherein the wearable device is a wrist watch.

5. The apparatus of claim 1, wherein the wireless power transmitting coil is substantially perpendicular to a planar surface upon which the hand-operated input device is configured to operate.

6. The apparatus of claim 1, further comprising:
a controller configured to receive health data from the wearable device corresponding to the user,
wherein the health data comprises a heart rate or a temperature of the user that is monitored during use of the hand-operated input device.

7. The apparatus of claim 6, wherein the health data is received by the hand-operated input device via load modulation performed at the wearable device.

8. The apparatus of claim 1, wherein the hand-operated input device comprises a power propagation device.

9. The apparatus of claim 1, wherein the hand-operated input device is configured to passively provide power via the wireless power repeating to wirelessly charge the wearable device worn by the user.

10. The apparatus of claim 9, wherein the hand-operated input device input device further comprises:
a phase shifter configured to enable the wireless power transmitting coil to provide the substantially constant current.

11. The apparatus of claim 1, wherein the wireless power transmitting coil has a shape matching that of the wearable device worn by the user.

12. The apparatus of claim 8, wherein the power propagation device comprises a phase shifter, which wirelessly couples the further wireless power receiving coil and the wireless power transmitting coil to one another.

13. A method of forming a wireless charging apparatus, the method comprising:
disposing a wireless power transmitting coil in an ergonomic support structure identified with a hand-operated input device at a location proximate to where a user's wrist is to be positioned when the user is operating the hand-operated input device such that the wireless power transmitting coil is disposed at an angle relative to a planar surface upon which the hand-operated input device is configured to operate, the angle aligning with a shape of the ergonomic support structure and enabling an increased magnetic coupling between the wireless power transmitting coil and a wireless power receiving coil of a wearable device worn by the user compared to the wireless power transmitting coil being disposed parallel with the planar surface,
wherein the hand-operated input device is configured to provide an input to a computing device,
wherein the wireless power transmitting coil is configured to generate a magnetic field to wirelessly transmit power to the wearable device worn by the user while the user is wearing the wearable device and operating the hand-operated input device, the wearable device being wirelessly charged via the magnetic coupling between the wireless power receiving coil and the wireless power transmitting coil, which is configured to provide a substantially constant current irrespective of a strength of the magnetic coupling, and
wherein the hand-operated input device further comprises a further wireless power receiving coil that is coupled to the wireless power transmitting coil and a further wireless power transmitting coil, the further wireless power receiving coil being configured to wirelessly receive power via the further wireless power transmitting coil, and to provide the wirelessly received power to the wireless power transmitting coil via wireless power repeating.

14. The method of claim 13, wherein the hand-operated input device is a computer keyboard.

15. The method of claim 13, wherein the hand-operated input device is a computer mouse.

16. The method of claim 13, wherein the wearable device is a wrist watch.

17. The method of claim 13, wherein the wireless power transmitting coil is disposed substantially perpendicular to a planar surface upon which the hand-operated input device is configured to operate.

18. An apparatus, comprising:
an ergonomic support structure configured to support a user's hand or wrist while operating a hand-operated input device configured to provide input to a computing device; and
a wireless power transmitting coil disposed in the ergonomic support structure, the wireless power transmitting coil being configured to generate a magnetic field for wireless charging,
wherein the wireless power transmitting coil is disposed in the ergonomic support structure at a location proximate to where a user's wrist is to be positioned when the user is operating the hand-operated input device such that the wireless power transmitting coil is disposed at an angle relative to a planar surface upon which the hand-operated input device is configured to operate, the angle aligning with a shape of the ergonomic support structure and enabling an increased magnetic coupling between the wireless power transmitting coil and a wireless power receiving coil of a wearable device worn by the user compared to the wireless power transmitting coil being disposed parallel with the planar surface,
wherein the wireless power transmitting coil is configured to wirelessly charge the wearable device worn by the user while the user is wearing the wearable device and operating the hand-operated input device, the wearable device being wirelessly charged via the magnetic coupling between the wireless power receiving coil and the wireless power transmitting coil, which is configured to provide a substantially constant current irrespective of a strength of the magnetic coupling, and
wherein the hand-operated input device further comprises a further wireless power receiving coil that is coupled to the wireless power transmitting coil and a further wireless power transmitting coil, the further wireless power receiving coil being configured to wirelessly receive power via the further wireless power transmitting coil, and to provide the wirelessly received power to the wireless power transmitting coil via wireless power repeating.

19. The hand-operated input device of claim 18, wherein the hand-operated input device is a computer keyboard or a computer mouse.

20. The hand-operated input device of claim 18, wherein the wearable device is a wrist watch.

* * * * *